Dec. 14, 1954    P. JEPSON    2,696,860
DEVICE FOR REMOVING ONE END OF AN EGG
Filed Sept. 26, 1950
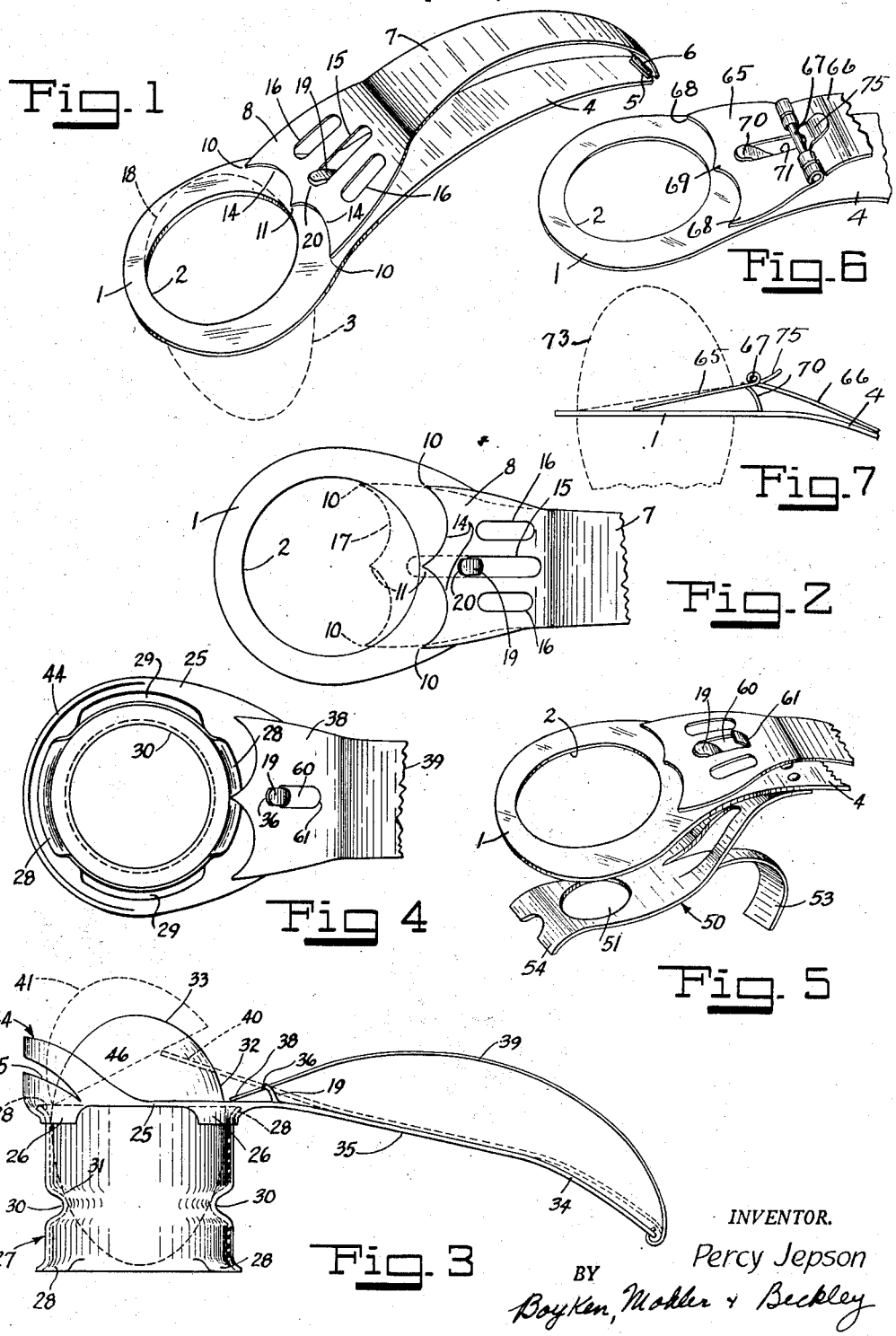
INVENTOR.
Percy Jepson
BY
Boyken, Mohler & Beckley
ATTORNEYS

United States Patent Office 2,696,860
Patented Dec. 14, 1954

2,696,860
DEVICE FOR REMOVING ONE END OF AN EGG
Percy Jepson, Oakland, Calif.

Application September 26, 1950, Serial No. 186,724

18 Claims. (Cl. 146—2)

This invention relates to an egg opener, and has for one of its objects the provision of an opener that is adapted to remove either of the ends of an egg to prepare the remainder for eating from an egg cup in the usual manner or for removing the contents of the shell, or for separating the yoke from the white, or for any other operation where it is desirable or necessary to open the egg.

The usual manner of opening soft boiled or raw eggs is to break the shell by a sharp blow applied transversely of the longitudinal axis of the egg near one end with the edge of a knife or with the edge of a spoon. A slight miscalculation may cut the egg too near the center and too deeply, resulting in spilling the contents of the shell and in breaking the yolk. Even a blow applied at the proper place may break the yolk if the blow is too hard. Many times undesirable fragments of the shell become mixed with the contents of the shell, and if the fracture is too near the end of the shell, there is difficulty in removing the contents.

One of the objects of this invention is the provision of an egg opener that will uniformly open eggs in the proper place without breaking the yolk, or spilling the contents of the shell, and without causing fragments of the shell to break off and enter the contents of the shell.

Heretofore in opening eggs, many times it is difficult to hold the hot egg in one hand while breaking the shell with the other, and also difficulty is had in the first place in getting the egg out of the water in which it has been boiled.

An object of the present invention is the provision of an egg opener that is provided with means for removing the egg from the water and for holding the same while it is being opened, and an additional object is the provision of a combined egg cup and holder so that the egg can both be opened and served in the same egg cup.

A still further object of the invention is the provision of an improved egg opener that is adapted to successively fracture the egg shell along a line at the desired point and that lifts the end of the shell along one side of said fracture as the breaking operation is completed.

Other objects and advantages will appear in the description and in the drawings.

In the drawings, Fig. 1 is a perspective view of an egg opener in its most simplified form, the egg being indicated in dash line in a position for removal of the uppermost end thereof.

Fig. 2 is an enlarged fragmentary plan view of the end of the opener through which one end of the egg is adapted to project, showing in dash lines the final position of the cutter on said opener. The full line position indicates the position of the cutter at the beginning of its movement.

Fig. 3 is a side elevational view of a slightly different form of egg opener, in which a holder for the egg is provided and in which the top end of the egg (when supported vertically in the holder) is automatically lifted at the conclusion of the cutting movement of the cutter. Also a yoke separator is indicated in Fig. 4 on the egg opener. The cutter is shown before the cutting with an egg in full line in the holder, and the dash lines indicate the final position of the center with the uppermost end of the egg elevated and in dash lines.

Fig. 4 is a top plan view of the egg holding end of the device of Fig. 3.

Fig. 5 is a perspective view of a still further form of the invention indicating a different type of holder for holding the egg during cutting off the top and means is provided for automatically elevating the upper end of the egg when it is ready for removal.

Figs. 6, 7 respectively are fragmentary perspective and side elevational views of another form of the invention showing the device at the start and at the finish of an operation.

In detail, the invention as shown in Figs. 1 and 2 comprises an annular head or member 1 that is preferably stamped from sheet metal, the central opening 2, being adapted to encircle either one end or the other of an egg, but the diameter of said opening is less than that of the egg so that the end of the egg will project through the opening and the edge of the opening will engage the egg along a line that is where the egg shell should be broken or cut in order to prepare the egg, such as a soft boiled egg, for eating from an ordinary egg cup. The major portion of the egg, such as is indicated in dash line at 3 in Fig. 1 is held below the annular head or member 1.

The annular member 1 has a flat upper side that is planar and a handle 4, formed integrally with the member 1, projects laterally from the member 1 when the latter is held horizontal, or substantially so, with the egg below said member and its uppermost end projecting upwardly through the opening 2 for the distance permitted by the diameter of the opening and the size of the egg.

The use of the words downwardly, upwardly, and other words indicating direction or position, are used with reference to the device when it is positioned in the normal egg opening position as described in the preceding paragraph. The words forward, forwardly, rear or rearwardly are used with reference to the member 1. The handle 4, for example, projects rearwardly from the member 1 and downwardly.

As above noted, handle 4 projects rearwardly from the annular member 1, and also curves downwardly, and at its rear end it is hinged at 6 to the rear end of the extension 7 of a cutter 8, said hinge preferably being formed by loop 6 formed on the rear end of said extension extending through an opening 5 in the rear end of handle 4 (Fig. 1) so that the loop pivotally secures the extension to the handle.

Cutter 8 and its extension 7 are integral and constitute a strip of spring sheet metal bowed longitudinally and upwardly away from handle 4 for its length intermediate hinge 6 and the cutter 8.

Cutter 8 is preferably wider than the extension 7 and its width is about equal to the diameter of the opening 2 (Fig. 2). The end edge of cutter 8 is adjacent the side of member 1 from which the handle 4 extends, and said edge is serrated to provide three teeth, the two outer teeth being indicated at 10 and the central tooth being designated 11.

Teeth 10, 11 have their points aligned along a line that is perpendicular to a radial line from the center of opening 2 bisecting the handle 4, and the central tooth 11 is on said radial line, while the teeth 10 are equally spaced therefrom and are substantially on lines parallel with the said radial line and respectively tangential to the two opposite sides of a circle defining the two opposite edges of opening 2. The edges of the cutter between the teeth 10, 11 are preferably curved, and said curves are the same and are preferably relatively shallow, each being equal to about a third of a circle.

As already stated, the cutter and extension 7, as a unit, are bowed from end to end, and the arc is such that its center is spaced a substantial distance from the portion of the handle therebelow. From this it will readily be seen that by forcing the central portion of the extension toward the handle, the cutter 8 will be moved in a direction across the opening and tooth 11 will move along the previously mentioned radial line of opening 2 that bisects handle 4.

Assuming an egg is in the position 3 indicated in Fig. 1, it will be seen that were the cutter 8 to move into the shell of the projecting end of the egg, unless the said cutter were flat against the flat upper side of the member 1, a lifting force would be applied to the upper end of the egg commencing with the initial penetration of tooth 11, which would tend to break the egg shell before any well developed line of weakness had been provided.

To insure the cutter being flat against said member 8, or in a plane parallel with the plane of said ring, the portion of the cutter at its juncture with the extension 7 is slotted, as indicated at 15. Several slots, as indicated at 16 may be provided, if necessary, although usually this is not essential if the spring steel from which the cutter and its extension is of the proper gauge, and the proportions of the cutter and extension are correct.

The slot 15 so weakens the cutter at said juncture as to cause the cutter to flatten against the member 8 as initial pressure is applied to member 7, and when the cutter is in a plane substantially parallel with that in which the member 1 is disposed, it will move in a direction straight across the opening 2.

When the extension 7 is substantially against the handle 4 at its central point, the cutter teeth will have moved to position 17 (Fig. 2). This position is short of the center of the egg, and is not deep enough to cut into the yolk.

Referring to Fig. 2, it will be seen that the central point 11 will be the first part of the cutter to penetrate the shell of the egg, and as soon as such penetration is effected the divergently rearwardly extending curved edges 14 at opposite sides of said tooth 11 will progressively tend to cut the shell in a manner to exert pressure oppositely and outwardly on the shell. This is highly desirable at this stage, since it tends to fracture the egg in the plane in which the cutter operates. Only after a substantial opening has been made do the curved edges of the cutter change to where there is a slight oppositely and inwardly directed pressure, but at this stage the shell has been broken ahead of the cutter so there is no cutting action.

When the cutter has reached its final position 17 the upper end of the shell of the egg, indicated at 18 in Fig. 1 will be resting on the cutter along almost half of its lower edge. By swinging the handle 4 and extension 7 upwardly as a unit about the edge of the opening 2 opposite the member 1 as a fulcrum, the said upper end 18 of the shell will be lifted off the remainder below said cutter. No fragments are produced by the cutting action, and the upper end of the egg will break along a circular line that is substantially coincident with that of the edge of the opening 2.

In operating the opener, the egg is held upright in one hand, and the handle 4 is held in the other hand with the thumb against a central point on the extension 7 of the cutter. Pressure on said extension is exerted by the thumb while the other fingers of the same hand support the handle 4.

In order to prevent the cutter from swinging away from the member 1, when not in use, and also to facilitate the handling of the device, an upwardly projecting lug 19 stamped from the handle below the slot 15 extends upwardly through said slot and is formed at its upper end with a lip that projects forwardly over the portion of the cutter at the front end of said slot when pressure on the extension 7 is removed. However, by pressing slightly on said extension, the said lip will be spaced from the front end of the slot a sufficient distance to enable the cutter to be swung freely away from the member 1 so the device can readily be cleaned whenever desired. The lug 19 also acts as a guide to insure against lateral movement of the cutter and extension 7.

From the above description, it will be seen that the extension 7 and handle 4 are so proportioned and shaped that the movement of the cutter will be restricted to a distance that will preclude likelihood of cutting into the yolk of an egg. The diameter of the opening 2 is such that where large eggs are used, the smaller end of the same can be projected through the opening 2, and if the eggs are substantially smaller, the larger end of the egg may be projected through said opening. In other words, the user can readily determine how much of the end of the egg is to be removed.

The invention as above described may be used for hot, soft boiled eggs, or for other eggs, cooked or uncooked, and in the latter case, the yolk can readily be separated from the white if desired by manipulation of the removed end and the remainder so as to retain the yolk in the shell while draining off the white.

The device shown in Figs. 3, 4 is similar to that of Fig. 1, except that provision is made for removing the egg from hot water and for holding it while the uppermost end is being removed, and also provision is made for automatically elevating the said uppermost end without tilting the device, as described for the form of invention already described.

In the form shown in Figs. 3, 4, the head 25 of the opener is formed with a substantially annular portion that in turn is formed with a slight downwardly and axially inwardly extending flange 26 (Fig. 3) at two opposite sides each equal to about a quarter of the periphery of opening.

In said opening is a tubular open-ended holder 27 that has oppositely outwardly flared portions 28 along each of its upper and lower edges, with the remainder between said portions 28 straight axially of the holder. The inner edges of the opening in the head 25 between the flanged portions 26 are cut away so that a quarter turn of the tubular member 27 will permit the flared portions 28 to slip through the cut-away sections 29 so that the tubular member will be released from the head 25.

Inasmuch as the structure at opposite ends of the tubular holder 27 are the same, it will be seen that either end may be uppermost in the head 25.

Intermediate the opposite ends of the holder, the latter is formed with a radially inwardly projecting rib 30, which rib is closer to the lower end of the holder, (as seen in Fig. 3) than it is to the upper end. As seen in Fig. 3, the lower end 31 of the egg 32 rests on rib 30 and the upper end 33 projects above the level of head 25.

In this instance the diameter of the central opening in head 25 is sufficient to enable the egg to pass therethrough from above so as to be supported on the annular rib 30. Obviously rib 30 could be in sections, rather than continuous.

Upon inverting the holder 27 in the head 25, the rib 30 would be closer to the top of the holder and a small egg would be held on the rib with its uppermost end the desired distance above the head 25. Larger eggs will have proportionately the same projection through the opening in head 25 when the rib 30 is closer to the lower end. Additional variation or adjustment can be obtained by holding the egg with it spointed end up or down as desired.

When the holder 27 is in head 25 as seen in Fig. 3, it may be used as a scoop to scoop the egg out of hot water preparatory to the removal of its uppermost end.

The handle 34 that is integral with head 25, varies from the handle 4 on head 1 in that a section 35 is straight for a substantial distance between its outer end and the head 25, providing junctures between the ends of said straight section and the head and rear end of the handle respectively. The lip 36 is the same as the one shown at 20 in Fig. 1 and the loop, as well as cutter 38 and extension 39 on said cutter are identical with loop 6, cutter 8, and extension 7 of Figs. 1, 2.

Upon pressing downwardly on the extension of the cutter, the same movement of the cutter in a direction across the opening in head 25 will occur as described for the invention shown in Figs. 1, 2. However, as soon as the extension is depressed to the point where the cutter has entered the egg to the same degree as the cutter shown in position 17 in Fig. 2, it will be seen that a gap will remain between the straight section 35 and said extension, thus permitting the extension to be pressed against said straight section. Upon so pressing the extension against said straight section, the cutter will immediately move upwardly to the dash line position 40 (Fig. 3) thereby elevating the upper end of egg 33 to position 41, in which position the said upper end may be lifted off the egg.

From the foregoing, it will be apparent that this same structure of the handle 34 is applicable to the invention as seen in Figs. 1, 2 in which case the elevation of the upper end of the egg is automatic when final pressure is applied to the extension after the cutter has moved to its position as indicated at 17 in Fig. 2.

After the above steps have been completed, the holder 27 with the egg therein may be readily removed from the head 25 and the holder will function in the same manner as the conventional egg cup.

Where the separation of the yolk from the white, in raw eggs, is desired, provision is made on the head 25 for accomplishing this result. The outer side of the head 25 may have an upstanding flange 44 formed therein, which flange closely resembles the pouring lip on a container, being generally semi-cylindrical, but of progressively increased width from its ends to the central portion.

This flange or lip 44 is formed with a slot 45 that extends longitudinally thereof, the ends of said slot being sharp, as seen at 46 and which ends are at about the level of the upper side of head 25. The slot curves upwardly from said ends to its widest central portion.

In operation, after the top of a raw egg has been removed, the white of the egg may be poured off through the slot 45, that is not wide enough to pass the yolk. The relatively tough albumenous connection between the white and yolk is readily cut off by rocking the head so that said connection is cut at one or the other of the pointed or sharp ends of the slot. It is to be noted that the flanged portion 26 on head 25 and the flared section 28 on the holder are along the lip 36 to permit pouring off the white without leakage.

Where the user may prefer the egg to be held against the annular head of the device from below, as in Figs. 1, 2, but objects to the discomfort of holding the hot egg in the hand, a holder such as seen in Fig. 5 may be provided.

Said holder comprises a spring clamping element 50 that is in the form of a spring metal strip secured at one end to the underside of the handle 4 of the device.

Inasmuch as all of the features of the device, except for element 50, and length of the slot in the cutter extension are identical with the structure shown in Fig. 1, the same numbers are used as in Fig. 1 in describing the device itself, apart from the clamping element and slot.

The strip or element 50 curves downwardly and then forwardly below the annular head 1, and the forward portion of said strip is formed with a relatively small egg positioning aperture 51 that is substantially coaxial with the opening 2.

Stamped from strip 50 is a finger engaging trigger-like piece 53 that projects rearwardly and downwardly from said strip, and the forward end 54 of the strip 50 is turned downwardly to provide a leg.

In operation, when the right hand of the operator holds the handle 4, the trigger finger of such hand is adapted to retract the trigger element 53 thus drawing the forward end of said element in a direction away from head 1 a sufficient distance to enable the head 1 and forward end of the element 50 to slip over opposite ends of the egg when the latter is in the hot water. By releasing the pressure on the trigger element 53 the forward end of strip 50 will engage the end of the egg adjacent thereto pushing the opposite end of the egg into opening 2 in head 1 and will hold the egg in the same position of the egg indicated in Fig. 1 with the egg coaxial with the axis of openings 2 and 51. The lower end of said egg will be sealed in the smaller opening 51 so that the egg will not become accidentally dislodged. As after the top of the egg has been removed, the device may be supported on a table on 54 and the rear end of handle 4 as a base, or it may be removed from the device, as desired.

It is also pertinent to note that in this form of invention the slot 60 that corresponds with slot 15 of Fig. 1 is shorter than slot 15. When the cutter has moved almost to a position corresponding with position 17 of Fig. 2, the rear end 61 of the slot will engage the inclined rear surface of the lug 19 and the cutter will consequently be elevated on the final movement to lift the upper end of the egg away from the remainder.

Either structure of Figs. 3 and 5 is suitable for use on the device of Fig. 1. However, as already explained, in the simplest form of the invention, where the egg is held by one hand, the mere swinging of the handle 4 upwardly will effect removal of the upper end thereof. Where other means is used to hold the egg, such as the cup of Fig. 3 or the clamp of Fig. 5, the structure for automatically elevating the upper end of the egg becomes more important. It is to be noted that the rear end of the slot preferably has an upwardly inclined lip 61 to facilitate upward movement of the cutter.

In the invention as shown in Figs. 6 and 7 the head 1 with opening 2 formed therein, and the handle 4 are identical with the invention as shown in Fig. 1, hence the same numerals are used as in Fig. 1 to identify said elements.

In Figs. 6, 7, a cutter 65 and an extension 66 are provided, which elements are much the same as the cutter 8 and extension 7 of Fig. 1 with the extension 66 hingedly connected to handle 4 in the same manner as extension 7 is connected with handle 4. However, the cutter 65 is hingedly connected with the extension 66 by a hinge pin 67 at a point adjacent the head 1.

The cutter 65 may have a central tooth 69 between a pair of outer teeth 68, as in Fig. 7. The cutter itself is preferably slightly wider than the one shown in Fig. 1 so that it cannot possibly slide through the opening 2 during movement across the head 1 with the teeth leading.

The upwardly and forwardly projecting lug 70 on handle 4 that substantially corresponds with lug 19 of Fig. 1 extends upwardly through a slot 71 formed along the hinged edge of cutter 65, and the cylindrical hinge pin 67 extends transversely of said slot across its rear end.

In operation, when the extension 66 is compressed or pressed toward handle 4, the cutter 65 will slide forwardly flat against the rear side of head 1 and the teeth will progressively enter the side of the egg along the rear edge of opening 2 in said head. After the cutter has moved about half way across the egg the hinge pin 67 will engage the rear side of lug 70 and then the final compression of the extension 66 against the handle will cause the rear end of the cutter to move upwardly as indicated in Fig. 7. This is the most desirable manner of causing the top 73 of the egg to be removed since the lifting force is against the edge of the shell where the point 69 initially entered the shell. The angle of the cutter and the plane that is coincidental with the lower edges of the top of the egg are substantially the same during the tilting of the top to effect its removal.

A real extension 75 of the cutter extends over the forward end of the extension 66 to prevent the toothed forward end of the cutter from accidentally swinging upwardly.

When the extension 66 is fully compressed against the handle 4, the hinge pin 67 will be at the upper end of lug 70, and will not pass over said lug. The lug 70 functions the same as lug 19 to prevent accidental swinging of the cutter and extension 66 away from the handle, unless the extension is intentionally compressed so that the forward end of slot 71 will clear the lug.

It is to be understood that the detailed description is not intended to restrict the invention to the details. The drawings and description merely show preferred forms of the invention.

It may be added with respect to Fig. 6 that the additional width of blade 65 is such that the forward outer edges of the blade will ride on the head 1 at all times and when an egg having a diameter less than that of opening 2 extends through the opening, the lower portion of the egg will be prevented from being lifted through opening 2.

I claim:

1. A device for removing one end of an egg comprising a centrally open member through the central opening of which said one end of an egg is adapted to project from one side of said member, a cutter against said one side of said member and adjacent one side of such egg when the latter projects from said one side, a handle on said member extending laterally therefrom and an elongated longitudinally bowed spring arm secured at one end to said cutter and at the opposite end to said handle at the end of the latter that is opposite to said member and with its concavely curved side facing said handle whereby straightening of said arm by pressing its outwardly bowed side toward said handle will cause said cutter to cut the shell of said egg when it is in said position projecting through said central opening for removal of the shell at said one end of said egg, and means engageable with said arm during said movement for moving said cutter in direction away from said member and axially of an egg projecting through the latter for automatically elevating the shell at said one end of said egg from the remainder.

2. A device for removing one end of an egg comprising a centrally open member through the central opening of which said one end of an egg is adapted to project from one side of said member, a cutter against said one side of said member and adjacent one side of such egg when the latter projects from said one side, a handle on said member extending laterally therefrom and an elongated longitudinally bowed spring arm secured at one end to said handle and at the opposite end to said member with its concavely curved side facing said handle, said cutter being movable into slidable engagement with a side of said member and partially across said opening upon straightening of said arm against said handle by pressing its outwardly bowed side toward said handle whereby said cutter will cut the shell of said egg when it is in said position projecting through said central opening for removal of the shell at said one end of said egg, said cutter having a central tooth positioned to initially engage the closest point on said egg to said cutter when said one end of said egg projects through said central opening, the said tooth having tapered sides for progressively cutting a wider opening in one side of said shell in opposite outward directions as said cutter progressively moves in direction across said central opening.

3. A device for removing one end of an egg comprising a member formed with an opening therein through which said one end of said egg is adapted to project, a cutter adjacent one side of said member and at one side of said opening, said cutter being supported for movement in direction across said opening and into an egg projecting therethrough, separate means respectively connected with said cutter and with said member engageable with each other when said cutter is moved to a position extending into an egg projecting through said opening for moving said cutter axially of said egg and in direction away from said member for lifting the shell on said one end of said egg away from the remainder, said cutter being movable axially of said member for so lifting said shell on said one end.

4. A device for removing one end of an egg comprising a member formed with an opening therein through which said one end of said egg is adapted to project, a cutter adjacent one side of said member and at one side of said opening, said cutter being supported for movement in direction across said opening and into an egg projecting therethrough, separate means respectively connected with said cutter and with said member engageable with each other when said cutter is moved to a position extending into an egg projecting through said opening for moving said cutter axially of said egg and in direction away from said member for lifting the shell on said one end of said egg away from the remainder, said cutter being movable axially of said member for so lifting said shell on said one end, a handle on said member projecting laterally therefrom and a finger actuatable arm connected with said cutter and supported on said arm for movement of said cutter in said direction across said opening upon pressure of said finger on said arm.

5. A device for removing one end of an egg comprising a member formed with an opening therein through which said one end of said egg is adapted to project, a cutter adjacent one side of said member and at one side of said opening, said cutter being supported for movement in direction across said opening and into an egg projecting therethrough, separate means respectively connected with said cutter and with said member engageable with each other when said cutter is moved to a position extending into an egg projecting through said opening for moving said cutter axially of said egg and in direction away from said member for lifting the shell on said one end of said egg away from the remainder, said cutter being movable axially of said member for so lifting said shell on said one end, a handle on said member projecting laterally therefrom and a finger actuatable arm connected with said cutter and supported on said arm for movement of said cutter in said direction across said opening upon pressure of said finger on said arm, said means including a member rigid with said member and said arm slidably engaging said arm only after a predetermined pressure has been applied on said arm.

6. A device for removing one end of an egg comprising an annular member providing a central opening of about the diameter of an egg at a point spaced a substantial distance from one end thereof whereby said one end will project through the central opening of said member when said egg and said opening are substantially coaxial, a flat cutter at one side of said member and at one side of said opening having a central tooth directed radially toward the axis of said opening, the width of said cutter being about equal to said diameter, said cutter being further provided with a pair of teeth equally spaced at opposite sides of said central tooth projecting in the same direction and similar to the direction in which said central tooth projects, the pointed ends of said pair of teeth being substantially on a straight line with the pointed end of said central tooth and on a line perpendicular to one extending through said axis and the point of said central tooth and said teeth being spaced from each other at points about equal to said diameter, the edge of said cutter between said central tooth and the teeth of said pair being concavely curved whereby movement of said cutter in direction across said opening and into said shell will result in said curved edges tending to cut in opposite outward directions for a substantial distance, means for restricting movement of said cutter in said direction to a point less than half way across said opening, said cutter being supported on said member for said movement and means for so moving said cutter.

7. A device for removing one end of an egg comprising a member formed with an opening through which one end of an egg is adapted to extend for projection from one side thereof when said egg is substantially coaxial with said opening, a holder for supporting an egg with its said one end extending through said opening, means for securing said holder to said member for so supporting said egg with said holder positioned at the side of said member opposite the side from which said one end of said egg is adapted to project, a cutter positioned at one side of said opening and supported for movement in direction across said opening for cutting into the side of the shell of an egg projecting through said opening, a spring arm on said cutter bowed longitudinally, said cutter being supported on said member, a rigid connection between the opposite end of said arm and said member and spaced from the bowed portion of said arm whereby pressure against said bowed portion for straightening it out will cause movement of said cutter in direction across said opening for cutting into the shell of an egg held by said holder with its said one end projecting through said opening.

8. A device for removing one end of an egg comprising a member formed with an opening through which one end of an egg is adapted to extend for projection from one side thereof when said egg is substantially coaxial with said opening, a holder for supporting an egg with its said one end extending through said opening, means for securing said holder to said member for so supporting said egg with said holder positioned at the side of said member opposite the side from which said one end of said egg is adapted to project, a cutter positioned at one side of said opening and supported for movement in direction across said opening for cutting into the side of the shell of an egg projecting through said opening, a spring arm on said cutter bowed longitudinally, said cutter being supported on said member, a rigid connection between the opposite end of said arm and said member and spaced from the bowed portion of said arm whereby pressure against said bowed portion for straightening it out will cause movement of said cutter in direction across said opening for cutting into the shell of an egg held by said holder with its said one end projecting through said opening, said holder being removable from said member in direction axially of said opening for removal of said egg.

9. A device for removing one end of an egg comprising a member formed with an opening through which one end of an egg is adapted to extend for projection from one side thereof when said egg is substantially coaxial with said opening, a holder for supporting an egg with its said one end extending through said opening, means for supporting said holder on said member, a cutter at the side of said member from which said one end of said egg is adapted to project and at the side of said member opposite said holder, means supporting said cutter on said member for movement from one side of said opening in direction across said opening for entering the side of said egg at said one end thereof to effect removal of the shell at said one end, said holder having a base at its end remote from said member for supporting the same upright with the remainder of said egg held therein whereby said holder may function as an egg cup.

10. A device for removing one end of an egg comprising a member formed with an opening through which one end of an egg is adapted to extend for projection from one side thereof when said egg is substantially coaxial with said opening, a holder for supporting an egg with its said one end extending through said opening, means for supporting said holder on said member, a cutter at the side of said member from which said one end of said egg is adapted to project and at the side of said member opposite said holder, means supporting said cutter on said member for movement from one side of said opening in direction across said opening for entering the side of said egg at said one end thereof to effect removal of the shell at said one end, said holder being tubular and open-ended and formed with a radially inwardly extending projection at a point spaced from the end from which said egg is adapted to project for supporting said egg thereon at the desired depth in said holder.

11. A device for removing one end of an egg comprising a member formed with an opening through which said one end of said egg is adapted to project when said egg and said opening are substantially coaxial, a cutter at one side of said opening, an elongated handle rigid with said member extending generally radially therefrom and from the axis of said opening, a spring arm on said cutter over said handle extending longitudinally of the latter and connected at its outer end remote from said cutter to said handle, said arm being bowed longitudinally spacing the portion between said cutter and said outer end of said arm from said handle with the concave side of said arm facing said handle whereby pressure on said bowed portion toward said handle and the straightening of said arm under said pressure will cause said cutter to slide across said opening for a predetermined distance to effect a cutting into the side of the shell of said one end of said egg when the latter extends through said opening.

12. A device for removing one end of an egg comprising a member formed with an opening through which said one end of said egg is adapted to project when said egg and said opening are substantially coaxial, a cutter at one side of said opening, a handle rigid with said member extending generally radially therefrom, a spring arm on said cutter over said handle and connected at its outer end remote from said cutter to said handle, said arm being bowed longitudinally spacing the portion between said cutter and said outer end of said arm from said handle with the concave side of said arm facing said handle whereby pressure on said bowed portion toward said handle will cause said cutter to slide across said opening for a predetermined distance to effect a cutting into the side of the shell of said one end of said egg when the latter extends through said opening, said handle being also bowed longitudinally in substantially the same direction as said arm but the degree of the curve of said arm being greater than that of said handle and said handle being curved directly away from said member to the side of the latter opposite the side from which said one end of said egg is adapted to project.

13. A device for removing one end of an egg comprising a member formed with an opening through which said one end of said egg is adapted to project when said egg and said opening are substantially coaxial, a cutter at one side of said opening, a handle rigid with said member extending generally radially therefrom, a spring arm on said cutter over said handle and pivotally connected at its outer end remote from said cutter to said handle, said arm being bowed longitudinally spacing the portion between said cutter and the pivoted end of said arm from said handle whereby pressure on said bowed portion toward said handle will cause said cutter to slide across said opening for a predetermined distance to effect a cutting into the side of the shell of said one end of said egg when the latter extends through said opening, said spring arm being flat and a portion of the material of said arm adjacent said cutter being removed to provide easier flexure of said arm adjacent said cutter when pressure is applied to said arm for tending to flatten it against said handle.

14. A device for removing one end of an egg comprising a member formed with an opening through which said one end of said egg is adapted to project when said egg and said opening are substantially coaxial, a cutter at one side of said opening, a handle rigid with said member extending generally radially therefrom, a spring arm on said cutter over said handle and pivotally connected at its outer end remote from said cutter to said handle, said arm being bowed longitudinally spacing the portion between said cutter and the pivoted end of said arm from said handle whereby pressure on said bowed portion toward said handle will cause said cutter to slide across said opening for a predetermined distance to effect a cutting into the side of the shell of said one end of said egg when the latter extends through said opening, said handle being formed with a straight section adjacent said member and extending slantingly in direction away from the side of the member from which said one end of said egg is adapted to project and beyond which said cutter is positioned in the direction of said opening whereby flattening of said arm against said flat section will effect movement of said cutter axially of said opening and in a direction away from said member after said cutter has moved a predetermined distance across said opening.

15. A device for removing one end of an egg comprising a member formed with an opening therein through which said one end of said egg is adapted to project, a cutter adjacent one side of said member and at one side of said opening supported on said member for sliding in one direction across said opening with its cutting edge leading and into an egg projecting therethrough, separate means respectively connected with said member and with said cutter engageable with each other when said cutter is moved partially across said opening for moving the trailing end of said cutter away from said member under the influence of force tending to move said cutter in said one direction, means connected with the trailing end of said cutter for so moving the latter.

16. A device for removing one end of an egg comprising a member formed with an opening therein through which said one end of said egg is adapted to project, a cutter adjacent one side of said member and at one side of said opening supported on said member for sliding in one direction across said opening with its cutting edge leading and into an egg projecting therethrough, separate means respectively connected with said member and with said cutter engageable with each other when said cutter is moved partially across said opening for moving the trailing end of said cutter away from said member under the influence of force tending to move said cutter in said one direction, means connected with the trailing end of said cutter for so moving the latter, a hinge connecting said trailing end of said cutter with said last mentioned means to permit said movement of said trailing end away from said member under said force when the leading end of said cutter is in engagement with said member.

17. A device for removing one end of an egg comprising a member having an opening formed therein through which said one end of said egg is adapted to project, a flat cutter blade supported at one side of said opening for movement in direction across said opening with its cutting edge leading and having a toothed leading edge adapted to enter a side of said egg at a point in a plane bisecting said egg and opening, the width of said blade being greater than the diameter of said opening whereby the blade will be supported on said member at opposite sides of said opening during its movement in direction across said member, the trailing edge of said blade being movable in direction away from said member when the leading edge at opposite sides of said plane are supported on a side of said member for lifting the top of said egg from the remainder thereof at the point of initial entry of said toothed edge into said egg upon such movement of said trailing edge, and means respectively connected with said member and with said blade engageable with each other after partial entry of said blade into said egg for so moving said trailing edge away from said member.

18. A device for removing one end of an egg comprising a horizontally disposed member having an opening formed therein through which the upper end only of such egg is adapted to extend from below, a cutter above said member and adjacent to one side of said opening, an elongated handle and an elongated flat spring secured to and projecting laterally from said member and from said cutter respectively with said spring over said handle for grasping said handle and spring in one hand of the user, the corresponding ends of said handle and spring that are remote from said member and said cutter being connected together, said spring being bowed with its concave side facing and spaced from said handle whereby straightening of said spring by pressing one of the fingers of said one hand against the convex side of said spring will cause said cutter to move in a direction generally longitudinally of said spring and partially across the upper side of said opening in slidable contact with said member for cutting the shell of an egg having its upper end extending into said opening with the upper end of said shell above said cutter.

References Cited in the file of this patent

UNITED STATES PATENTS

| Number | Name | Date |
|---|---|---|
| 173,915 | Deutsch | Feb. 22, 1876 |
| 190,784 | Schultze | May 15, 1877 |
| 239,197 | Scharff | Mar. 22, 1881 |
| 266,007 | Badger | Oct. 17, 1882 |
| 375,298 | Lilly | Dec. 20, 1887 |
| 446,545 | Blodgett | Feb. 17, 1891 |
| 561,969 | Craig | June 16, 1896 |
| 1,449,408 | Hull | Mar. 27, 1923 |
| 2,087,815 | Rose | July 20, 1937 |
| 2,509,630 | Duffy | May 30, 1950 |

FOREIGN PATENTS

| Number | Country | Date |
|---|---|---|
| 456,231 | France | June 13, 1913 |
| 499,647 | France | Nov. 25, 1919 |